US005868819A

United States Patent [19]
Guhde et al.

[11] Patent Number: 5,868,819
[45] Date of Patent: Feb. 9, 1999

[54] WATER-REDUCIBLE COATING COMPOSITION FOR PROVIDING CORROSION PROTECTION

[75] Inventors: Donald J. Guhde, Euclid; Terry E. Dorsett; Deborah A. O'Brien, both of Chardon; Walter H. Gunn, Painesville; Victor V. Germano, Mentor, all of Ohio

[73] Assignee: Metal Coatings International Inc., Chardon, Ohio

[21] Appl. No.: 650,188

[22] Filed: May 20, 1996

[51] Int. Cl.$^6$ .............................. C23F 11/00; B32B 9/04
[52] U.S. Cl. ........................................ 106/14.14; 428/391
[58] Field of Search ........................ 428/391; 106/14.14

[56] References Cited

U.S. PATENT DOCUMENTS

| | | | |
|---|---|---|---|
| 3,592,699 | 7/1971 | Steinbrecher et al. | 148/6.2 |
| 3,671,331 | 6/1972 | Malkin et al. | 148/6.2 |
| 3,687,738 | 8/1972 | Malkin | 148/6.2 |
| 3,730,746 | 5/1973 | Boaz . | |
| 3,776,881 | 12/1973 | Lerner et al. . | |
| 3,907,608 | 9/1975 | Barrett et al. | 148/6.2 |
| 3,940,280 | 2/1976 | de Ridder | 106/193 M |
| 4,098,749 | 7/1978 | Hoshino et al. | 260/30.6 R |
| 4,213,886 | 7/1980 | Turner | 260/29.6 MM |
| 4,218,354 | 8/1980 | Hayati et al. . | |
| 4,266,975 | 5/1981 | Higashiyama et al. | 106/1.12 |
| 4,277,284 | 7/1981 | Ginsberg et al. | 106/1.05 |
| 4,365,003 | 12/1982 | Danforth et al. | 428/552 |
| 4,476,260 | 10/1984 | Salensky | 523/402 |
| 4,555,445 | 11/1985 | Frey et al. | 428/340 |
| 5,283,280 | 2/1994 | Whyte et al. | 524/559 |
| 5,300,323 | 4/1994 | Ahmed | 427/327 |
| 5,389,405 | 2/1995 | Purnell et al. | 427/387 |
| 5,412,011 | 5/1995 | Morris et al. | 524/261 |

FOREIGN PATENT DOCUMENTS

| | | |
|---|---|---|
| 0108536 | 10/1983 | European Pat. Off. . |
| 52-086424 | 7/1977 | Japan . |
| 52-086425 | 7/1977 | Japan . |
| 53-018639 | 2/1978 | Japan . |
| 53-14746 | 2/1978 | Japan . |
| 53-042220 | 4/1978 | Japan . |
| 55-142063 | 11/1980 | Japan . |
| 59-177177 | 10/1984 | Japan . |
| 4-046932 | 2/1992 | Japan . |
| 1360451 | 7/1974 | United Kingdom . |
| WO95/21277 | 8/1995 | WIPO . |

*Primary Examiner*—Mary E. Ceperley
*Attorney, Agent, or Firm*—John J. Freer

[57] ABSTRACT

There is disclosed a water-reducible, chromium-free coating composition for providing corrosion protection to a substrate, such as a metal substrate. The deposited coating film is corrosion-resistant and for coated articles which are threaded, e.g., steel fasteners, the coating provides a non-thread-filling coating. The coating composition contains particulate metal, such as particulate zinc or aluminum. Although substituents can be separately packaged, the composition is virtually always a one-package coating composition. The composition contains water-reducible organo-functional silane, particularly an epoxy functional silane, as a binding agent. The composition has highly desirable, extended shelf life. The composition can be easily applied in the usual manner, such as dip-drain or dip-spin technique, and readily cures at elevated temperature.

78 Claims, No Drawings

WATER-REDUCIBLE COATING COMPOSITION FOR PROVIDING CORROSION PROTECTION

BACKGROUND OF THE INVENTION

A variety of at least substantially resin-free, chromium-containing coating compositions for protecting ferrous substrates are known. Of special interest are those which contain particulate metal. Representative coating compositions of this type that were initially developed could be quite simplistic, such as compositions containing essentially chromic acid and particulate metal in an alcohol medium, as disclosed in the U.S. Pat. No. 3,687,738.

A later development of particular effectiveness for providing a corrosion-resistant coating on metal substrates was the more complex composition such as shown in U.S. Pat. No. 3,907,608. The composition comprised chromic acid, or equivalent, a particulate metal of mainly zinc or aluminum, wetter and a liquid medium comprising water plus high-boiling organic liquid. The composition had very desirable coating characteristics when including a viscosity modifier such as a water-soluble cellulose ether, as disclosed in U.S. Pat. No. 3,940,280.

The coating could be especially useful as an undercoating. Thus it has been taught to use such a more complex coating composition as an undercoating over ferrous surfaces. The coating is then provided with a silicate topcoating, as disclosed in U.S. Pat. No. 4,365,003. Another topcoating that could be utilized is a weldable primer, most notably a zinc-rich primer, which may be typically applied before electrical resistance welding of the substrate, as discussed in the hereinbefore mentioned U.S. Pat. No. 3,940,280.

It has been known that where coating compositions could contain the particulate metal as untreated aluminum flake, such flake can be unstable in water-based coating compositions. In such water-based coating compositions, standard aluminum flake will react with water in the composition to form hydrogen gas. One approach for avoiding this problem has been to coat the aluminum flake. One such coating is an acrylic coating formed by reacting mono-ethylenically unsaturated silane with acrylic monomers having amine hydroxyl or epoxy groups, as disclosed in U.S. Pat. No. 4,213,886. However, these products are specialty items tailored to provide a coating of good glamour appearance and have not found a wide acceptance.

Another approach to improving the coating composition was to consider the chromic acid constituent. As taught in U.S. Pat. No. 4,266,975 this constituency can be partially replaced by boric acid component. However, some chromic acid for the constituency is retained.

For coating compositions for providing corrosion-resistance to metal substrates, which compositions are of the particular type referred to as "wash primers", such have conventionally contained zinc chromate pigment. Attempts have been made with these primers to provide anti-corrosion primers free from chromium, thus reducing potential pollution problems. There has been proposed, as disclosed in U.S. Pat. No. 4,098,749, a coating composition containing a polyvinyl butyral resin, an organofunctional silane, a borate or polyphosphate compound and phosphoric acid. The composition may contain a metal powder as an optional ingredient and usually a phenolic resin. Such compositions, however, are not suitable as replacements for the above discussed complex compositions of pulverulent metal and chromium-providing substance, owing in part to their resin content.

As mentioned hereinabove, the corrosion-resistant coatings can be combinations of undercoatings and topcoatings. The topcoatings can be solvent-based weldable zinc-rich primers. For the topcoatings, such as these zinc-rich primers, it has been proposed, as disclosed in U.S. Pat. No. 4,476,260, to enhance primer corrosion-resistance by formulating a primer to contain zinc pigment, a thermoplastic or thermosetting resin, an organosilane, and optionally aluminum trihydrate with one or more dispersing agents. Such compositions, however, are not suitable as replacements for the complex undercoating compositions, and would be useful in the combination of coatings as the zinc-rich topcoating.

It would, therefore, be desirable to provide a coating composition which could have the wide acceptance of the complex undercoating compositions. It would further be desirable to provide such compositions which would avoid the pollution problems associated with the compositions which contain hexavalent chromium, as well as avoid compositions which are solvent-based.

SUMMARY OF THE INVENTION

The present invention offers a water-reducible coating composition having highly desirable characteristics such as corrosion-resistance on coated steel parts. In addition to corrosion-resistance, the deposited film has desirable coating adhesion on the substrate. For small, threaded parts, such as threaded fasteners, the coating can be a non-thread filling coating. The composition is chrome-free in addition to being water-reducible. Coating application equipment can thereby be readily cleaned and the cleaning liquid can be easily and economically disposed. The coating composition of the present invention can virtually always readily be a one-package composition, thereby providing ease of preparation, storage and transport as well as use. The composition lends itself to extended storage stability.

In one aspect, the invention is directed to be a chrome-free, water-reducible coating composition for application to, and heat curing on, a substrate for providing corrosion protection thereto, which composition comprises, together with aqueous medium:

(A) high-boiling organic liquid;
(B) particulate metal;
(C) thickener;
(D) silane binding agent contributing from about 3 to about 20 weight percent of the total composition weight; and
(E) wetting agent.

In another aspect, the invention is directed to related compositions to the above-noted ingredients, with one or more of the substances (A), (C) and (E) being optional. Such related compositions can include blends that are precursors to preparing the complete, water-reducible coating composition. These can be blends comprising substituents such as of (A), (D) and (E), or of (A) plus (B) plus (D), or of aqueous medium with boric acid component and the (D) constituency, with or without the (E) substituent.

Another aspect of the invention is directed to a coated substrate protected with a chrome-free, corrosion-resistant coating of the deposited and cured film from the herein described coating composition. In another aspect, the invention is directed to a method of preparing a corrosion-resistant coated substrate by applying the herein described coating composition to the substrate in an amount to provide at least about 500 milligrams per square foot (mg/ft$^2$) of coating on the substrate upon curing the applied composition on the substrate at a temperature up to about 650° F. for a time of at least about 5 minutes.

A yet further aspect of the invention is directed to the method of preparing the water-reducible coating composition by first blending together a precursor mixture of high-boiling organic liquid, wetting agent and particulate metal, then admixing to the mixture silane binding agent, which may be in mixture with cellosize thickener. The resulting composition can be diluted with aqueous medium.

In a still further aspect, the invention is directed to preparing a coating composition premixture of wetting agent, silane binding agent and, usually optional, boric acid component, with a liquid medium of aqueous medium, or of organic liquid, or both aqueous medium and organic liquid, and then using subsequent processing comprising admixing particulate metal with this premixture to provide a final coating composition.

DESCRIPTION OF THE PREFERRED EMBODIMENTS

The coating composition described herein, when prepared in final form for application to a substrate, will usually be referred to herein simply as the "coating composition" or "final coating composition". However, it may also be referred to as a "water-reducible coating composition". For supplying the liquid medium, sometimes referred to herein as the "aqueous medium", of the coating composition, there will virtually always be used water, or a combination of water plus high-boiling organic liquid. Other liquids may possibly be used with water, or with the liquid combination, but preferably only a very minor amount of the medium is such other liquid material. Typically, water is present in the composition in an amount from about 30 to 60 weight percent, basis total composition weight.

The high-boiling organic liquid of the coating composition liquid medium should have a boiling point at atmospheric pressure above about 100° C., while preferably being water soluble. Useful organic liquids contain carbon, oxygen and hydrogen and have at least one oxygen-containing constituent that may be hydroxyl, or oxo, or a low molecular weight ether group, i.e., a $C_1$–$C_4$ ether group, so that for convenience such liquids can be referred to as "oxohydroxy liquids". Since water dispersibility and preferably water solubility is sought, high molecular weight polymeric hydrocarbons are not particularly suitable, and advantageously serviceable hydrocarbons contain less than about 15 carbon atoms and have a molecular weight of 400 or less.

Particular hydrocarbons which may make up the high-boiling organic liquid include tri- and tetraethylene glycol, di- and tripropylene glycol, the monomethyl, dimethyl, and ethyl ethers of these glycols, low molecular weight liquid polypropylene glycols, as well as diacetone alcohol, the low molecular weight ethers of diethylene glycol, and mixtures of the foregoing. Usually, the organic liquid will be present in an amount from about 1 to about 30 weight percent, basis total composition weight. Presence of the organic liquid, particularly in amounts above about 10 weight percent, e.g., at 15 to 25 weight percent, can enhance the corrosion-resistance of the coating, but use of greater than about 30 weight percent can become uneconomical. For economy, ease of composition preparation, and for reduced volatile constituents in the composition, dipropylene glycol is preferred and is preferably present in an amount between about 1 to 4 weight percent of the total composition. It is to be understood that the organic liquid is typically provided to the composition as a separate component, but that some to all of the liquid may be introduced in another manner. Where metal particles have been prepared as metal flake in organic liquid medium, the resulting particulate metal may be in paste form. Where such paste form metal is used, it can provide some portion to all of the organic liquid to the coating composition. For example, aluminum flake paste can be 25 weight percent diproplyene glycol and readily contribute one weight percent of such glycol to the overall composition. For contributing particulate aluminum, the use of aluminum flake paste can be economical. Hence, for economy, those compositions which contain aluminum flakes can be expected to have a combination liquid medium of water plus high-boiling organic liquid.

It is contemplated that the coating composition will typically contain thickener. This will be between about 0.05 to about 2.0 weight percent of thickener. This can be a water-soluble cellulose ether, including the "Cellosize" (trademark) thickeners. Suitable thickeners include the ethers of hydroxyethylcellulose, methylcellulose, methylhydroxypropylcellulose, ethyl-hydroxyethylcellulose, methylethylcellulose or mixtures of these substances. Although the cellulose ether needs to be water soluble to augment thickening of the coating composition, it need not be soluble in the high-boiling organic liquid. Less than about 0.05 weight percent of the thickener will be insufficient for imparting composition thickness, while greater than about 2 weight percent of thickener in the composition can lead to elevated viscosities which provide compositions that are difficult to work with. Preferably, for the best thickening without deleterious elevated viscosity, the total composition will contain from about 0.2 to about 1.2 weight percent of thickener. It will be understood that although the use of a cellulosic thickener is contemplated, and thus the thickener may be referred to herein as cellulosic thickener, some to all of the thickener may be other thickener ingredient. Such other thickening agents include xanthan gum, associative thickeners, such as the urethane associative thickeners and urethane-free non-ionic associative thickeners, which are typically opaque, high-boiling liquids, e.g., boiling above 100° C. Other suitable thickeners include modified clays such as highly beneficiated hectorite clay and organically modified and activated smectite clay, although such is not preferred. When thickener is used, it is usually the last ingredient added to the formulation.

The particulate metal of the coating composition can, in general, be any metallic pigment such as finely divided aluminum, manganese, cadmium, nickel, stainless steel, tin, ferroalloys, magnesium or zinc. The particulate metal is most particularly zinc dust or zinc flake or aluminum dust or aluminum flake. The particulate metal may be a mixture of any of the foregoing, as well as comprise alloys and intermetallic mixtures thereof. Flake may be blended with pulverulent metal powder, but typically with only minor amounts of powder. The metallic powders typically have particle size such that all particles pass 100 mesh and a major amount pass 325 mesh ("mesh" as used herein is U.S. Standard Sieve Series). The powders are generally spherical as opposed to the leafing characteristic of the flake.

Where there is combined in the composition particulate zinc with aluminum, the aluminum may be present in very minor amount, e.g., from as little as about 2 to about 5 weight percent, of the particulate metal, and still provide a coating of bright appearance. Usually the aluminum will contribute at least about 10 weight percent of the particulate metal. Thus, frequently, the weight ratio of aluminum to zinc in such a combination is at least about 1:9. On the other hand, for economy, the aluminum will not contribute more than about 50 weight percent of the zinc and aluminum total, so that the aluminum to zinc weight ratio can reach 1:1. The particulate metal content of the coating composition will not exceed more than about 35 weight percent of the total composition weight to maintain best coating appearance, but will usually contribute at least about 10 weight percent to consistently achieve a desirable bright coating appearance. Advantageously, where aluminum is present, and especially where it is present without other particulate metal, the aluminum will provide from about 1.5 to about 35 weight percent of the total composition weight. Typically, when particulate zinc is present in the composition, it will provide from about 10 to about 35 weight percent of the total composition weight. As has been discussed hereinbefore, particularly where the metal has been prepared in flake form in liquid medium, the metal can contribute some liquid in minor amount, e.g., dipropylene glycol or mineral spirits, or some liquid even in trace amount. Particulate metals contributing liquid are usually utilized as pastes, and these pastes can be used directly with other composition ingredients. However, it is to be understood that the particulate metals may also be employed in dry form in the coating composition.

In addition to the particulate metal, another necessary ingredient in the water-reducible coating composition is silane. By use herein of the word "silane", or by using the term "silane binding agent", it is meant a water-reducible, organofunctional silane. The organofunctionality can be represented by vinyl, methacryloxy and amino, but is preferably epoxy functional for enhanced coating performance as well as composition stability. The agent generally contains the —Si(OCH$_3$)$_3$ functionality. The silanes utilized have heretofore usually been employed as surface treatment agents. It was unexpected to find that in the compositions of the present invention, they were serving as binding agents. Because of this, they are often referred to herein as silane binding agents. They can also serve to stabilize the coating bath against autogenous, deleterious reaction. The silane appears to bind and passivate the particulate metal so that coating composition bath stability is enhanced. Moreover, in the applied coating, coating adhesion and corrosion-resistance are improved. To provide these characteristics, the silane will contribute from about 3 weight percent to about 20 weight percent of the total composition weight. Less than about 3 weight percent of the silane will be insufficient to desirably enhance bath stability as well as coating adhesion. On the other hand, greater than about 20 weight percent of the silane will be uneconomical. Generally, for enhanced bath stability coupled with desirable economy, the silane will contribute from about 5 weight percent to about 12 weight percent of the total composition weight. The silane is advantageously easily dispersible in aqueous medium, and is preferably soluble in such medium. Preferably, the useful silane is an epoxy functional silane such as beta-(3,4-epoxycyclohexyl) ethyltrimethoxysilane, 4(trimethoxysilyl) butane-1,2 epoxide or gamma-glycidoxypropyltrimethoxysilane.

As an alternative to directly using concentrated silane, the silane may be utilized as a more dilute premixture of the silane, such as mixed with a diluent. The resulting silane-containing premixture, containing as little as 10 weight percent of silane, can be blended with other composition ingredients.

For example, where a precursor mixture has been prepared from the high-boiling organic liquid and wetting agent, which agent will be more particularly described hereinbelow, while further including particulate metal, the silane may be admixed directly into such precursor mixture, usually as a concentrated liquid containing more than 95 weight percent of silane. Such precursor mixture, which is usually mixed together such as by moderate agitation, will typically contain from about 25 to about 40 weight parts of organic liquid, from about 4 to about 8 weight parts of wetting agent and a balance of particulate metal, basis 100 weight parts of precursor mixture. To 100 weight parts of this mixture, there can be added sufficient silane binding agent to provide from about 3 to about 20 weight percent of the agent, basis weight of the final coating composition. This addition can be followed by adding thickener, usually to provide from 0.05 weight percent to about 2 weight percent of thickener, also basis total final coating composition weight. It is contemplated that the thickener may be added in admixture with the silane. After addition of the binding agent, the composition may further be diluted to contain from about 30 to about 60 weight percent of aqueous medium, basis final coating composition weight.

Additionally, it is contemplated that the silane binding agent can initially be mixed together with any of the other necessary composition ingredients, although it will most always be present in any composition before particulate metal is added to that composition. For example, it can be admixed with a composition liquid ingredient or, as discussed hereinbelow, mixed as a premixture of ingredients. Also, the silane in a liquid form, such as in a diluent, can be mixed with other coating composition ingredients which are in solid or liquid form.

Such additional ingredients for this premixture can include, for example, wetting agent, or wetting agent plus thickener, or wetting agent plus boron-containing compound, or aqueous medium plus boron-containing compound, which compound will be more particularly discussed hereinbelow. Such premixture may be made up with liquid which may or may not include aqueous medium, and may or may not include organic liquid, e.g., the above-discussed high-boiling organic liquids. A representative premixture will be more particularly discussed hereinbelow in regard to packaging. It is contemplated that the premixture can be blended with the above-mentioned precursor mixture of organic liquid, wetting agent and particulate metal. Particularly where the above-mentioned precursor mixture and the premixture do not contain thickening agent, they are resin-free. Such a resin-free, premixture may sometimes be referred to hereinafter for convenience as a "preblended premix".

In the preferred total coating composition, for the purpose of helping the dispersing of the particulate metal, there is added a dispersing agent, i.e., surfactant, serving as a wetting agent. Suitable such wetting agents include the nonionic alkylphenol polyethoxy adducts, for example. Also, there can be used anionic organic phosphate esters. The amount of such surfactant is typically present in an amount from about 0.01 to about 3 weight percent of the final mixture.

The coating composition may also contain what is usually referred to herein as a "boric acid component", or "boron-containing compound". For the "component" or for the "compound", as the terms are used herein, it is convenient to use orthoboric acid commercially available as "boric acid", although it is also possible to use various products obtained by heating and dehydrating orthoboric acid such as metaboric acid, tetraboric acid and boron oxide. Moreover, usually only as a minor amount, although it can be more, there can be used salts, e.g., up to 40 weight percent or more of the boric acid component may be supplied by borax, zinc borate or the like. The boric acid component should be present in an amount of at least about 0.1 weight percent to provide demonstrable enhancement of the corrosion-resistance characteristic of the coating. Such component may be present in an amount up to about 10 weight percent or more of the composition. Advantageously, for efficient corrosion-resistance, the composition will contain from about 0.2 to about 5 weight percent boric acid component, with from about 0.4 to about 0.8 weight percent being preferred.

It is contemplated that the composition may contain a pH modifier, which is able to adjust the pH of the final composition. Usually, the composition will be at a pH within the range from about 6 to about 7, but may be above 7. The pH modifier is generally selected from the oxides and hydroxides of alkali metals, with lithium and sodium as the preferred alkali metals for enhanced coating integrity; or, it is selected from the oxides and hydroxides usually of the metals belonging to the Groups IIA and IIB in the Periodic Table, which compounds are soluble in aqueous solution, such as compounds of strontium, calcium, barium, magnesium, zinc and cadmium. The pH modifier may also be another compound, e.g., a carbonate or nitrate, of the foregoing metals.

The coating composition may contain additional ingredients. These other ingredients may further include phosphates. It is to be understood that phosphorous-containing substituents, even in slightly soluble or insoluble form, may be present, e.g., as a pigment such as ferrophos. The additional ingredients will frequently be inorganic salts often typically employed in the metal coating art for imparting some corrosion-resistance or enhancement in corrosion-resistance for metal surfaces. Such materials include calcium nitrate, dibasic ammonium phosphate, calcium sulfonate, lithium carbonate (also useful as a pH modifier), or the like, and these are most usually employed in the coating composition in a total combined amount of from about 0.1 to about 2 weight percent. Greater than about 2 weight percent of such additional ingredient may be utilized where it is present for a combination of uses, such as lithium carbonate used as a corrosion-inhibitor and also as a pH adjusting agent.

As mentioned hereinabove, the composition should be chrome-free, which may also be referred to herein as "chromium-free". By being chrome-free it is meant that the composition preferably contains no hexavalent chromium, such as could be contributed by chromic acid or dichromate salts. If any hexavalent chromium is present, advantageously it should not exceed trace amounts, e.g., be present to provide less than 0.1 milligrams of chromium per square foot of coating, for best environmental concerns. It is to be understood that the composition may contain chromium in non-soluble form, as for example metallic chromium contributed as part of a particulate metal which might be in alloy form or present as an intermetallic mixture. Where compositions herein have been described as resin-free, such are preferably completely resin-free, but such is meant to exclude all but very minor amounts, e.g., trace amounts of resin. By resin it is meant the generally synthetic, polymeric resins, which are typically used as binders in paint systems.

Even considering storage stability, the composition is virtually always a one-package formulation. It will, however, be understood that, as mentioned hereinbefore, a precursor mixture, containing ingredients such as particulate metal, organic liquid and wetting agent, can be prepared. This can be separately packaged. Other ingredients may also be available as a pre-blended package of ingredients, e.g., silane binding agent, with one or both of wetter and boric acid component, with or without thickener, which all could be in a liquid medium. This package could be the above-mentioned premixture. It could further contain inorganic salts useful for imparting enhanced corrosion-resistance to an applied coating. This package, when wetter is present and boric acid may or may not be present, may contain such ingredients in the following weight percents, all basis 100 percent total package weight: 0 to about 15 percent thickener, about 15 to about 60 percent silane, 0 to about 10 percent (typically about 2 to about 6 percent) boric acid component, 0 to about 5 percent corrosion-inhibitor, about 10 to about 30 percent wetting agent and a balance, e.g., about 20 to about 30 percent of liquid, such as high-boiling organic liquid. The package may have sufficient water added thereto to provide as much as about 50 or more, but more usually up to 30, weight percent aqueous medium, basis the weight of a package containing water.

The final coating composition, as a whole or as separate packages, may be prepared in concentrated form. For example, the above package formulation could be made up with as little as 5 to 20 weight percent water, then the package would be blended with additional water to provide up to about 60 weight parts water in the final coating composition. A representative concentrate in this regard is a package where boric acid is present, but without wetter. Such a package could contain about 40 to about 80 percent silane, about 1 to about 4 percent boric acid component and a balance of water. Where thickener is present in a package, it is usually in an amount of at least about 2 weight percent, and where corrosion-inhibitor is present, it will typically be present in an amount of at least about 0.5 weight percent, both basis total package weight.

Where particulate aluminum will be used in the coating composition, and especially where both particulate zinc and particulate aluminum will be employed, a variant of the above packaging considerations may be utilized. It is most preferred to use such a zinc and aluminum combination and to start with a mixture, susceptible to packaging, of about 10 to 15 percent wetting agent, about 2 to 5 percent boric acid component, about 15 to 35 percent silane binding agent and a balance of aqueous medium to provide 100 weight percent total mixture weight. Into this mixture, there can then be dispersed particulate metal, usually as a flake, e.g., zinc flake. Additional aqueous medium may be added, whereby the resulting metal-containing dispersion can contain about 25 to 45 weight percent of the particulate metal and from as much as about 40, up to about 60, weight percent aqueous medium, both basis the total weight of the resulting dispersion.

Typically, there is then separately prepared an additional package precursor blend to introduce the particulate aluminum into the final coating composition. This particulate aluminum will generally be aluminum flake, but it is to be understood that other metals in flake form, e.g., zinc flake, may be present with the aluminum in this precursor blend. This additional package can contain from about 20 to about 35 percent (typically about 25 to about 30 percent) of silane binding agent, from about 20 to about 35 percent (typically from about 25 to about 30 percent) of high-boiling organic liquid, and from about 30 to about 50 percent (typically from about 35 to about 45 percent) of particulate aluminum, e.g., aluminum in flake form, to provide the 100 weight percent total for this additional package. Then, usually, from about 5 weight percent to about 20 weight percent of this additional package is combined with from about 80 to about 95 weight percent of the metal-containing dispersion to prepare, typically, a powdered zinc plus aluminum flake final coating composition.

Even when made as a one-package formulation, the composition has highly desirable storage stability. This confirms the binding ability of the silane to protect the particulate metal from deleterious reaction with other composition ingredients during extended storage. Such extended shelf stability was unexpected, owing to the recognized reaction problems of particulate metal in water-reducible systems, e.g., the gassing of aqueous compositions containing particulate zinc. However, even after many months of storage as a single package, compositions of the present invention can be unpackaged, prepared for coating application as by brisk stirring, then readily applied. Resulting coatings can have the same desirable corrosion-resistance, and often the other coating characteristics, of coatings applied from freshly prepared compositions.

Where a pre-blended premix is used in the bath preparation, e.g., of ingredients including silane binding agent, water, wetter and high-boiling inorganic liquid, with or without boric acid component, it has been found desirable to age the blend. This is aging before admixing with particulate metal. Aging can help provide better coating performance. Usually, aging of the blend will be for at least 1 hour, and advantageously for at least about 2 hours to about 7 days. Aging for less than 1 hour can be insufficient for developing desirable bath characteristics, whereas aging for greater than 7 days can be uneconomical. Preferably, the premix blend is aged for about 1 to 5 days.

The coating composition of the final bath, whether freshly prepared or after taken from storage, may be applied by various techniques, such as immersion techniques, including dip drain and dip spin procedures. Where parts are compatible with same, the coating can be applied by curtain coating, brush coating or roller coating and including combinations of the foregoing. It is also contemplated to use spray technique as well as combinations, e.g., spray and spin and spray and brush techniques. Coated articles that are at elevated temperature can be coated without extensive cooling by a procedure such as dip spin, dip drain or spray coat.

The protected substrate can be any substrate, e.g., a ceramic or similar substrate, but is most particularly a metal substrate such as a zinc or iron, e.g., steel, substrate, an important consideration being that any such substrate withstand the heat curing conditions for the coating. By a "zinc" substrate it is meant a substrate of zinc or zinc alloy, or a metal such as steel coated with zinc or zinc alloy, as well as a substrate containing zinc in intermetallic mixture. Likewise, the iron of the substrate can be in alloy or intermetallic mixture form. Especially where such are metal substrates, which are most usually ferrous substrates, these may be pretreated, e.g., by chromate or phosphate treatment, prior to application of the undercoating. Thus, the substrate may be pretreated to have, for example, an iron phosphate coating in an amount from about 50 to about 100 mg/ft$^2$ or a zinc phosphate coating in an amount from about 200 to about 2,000 mg/ft$^2$.

After application of the coating composition to the substrate, it is preferred for best corrosion-resistance to subsequently heat-cure the applied coating. However, volatile coating substances may be initially simply vaporized from the applied coating, e.g., by drying before curing. Cooling after drying may be obviated. The temperature for such drying, which may also be referred to as precuring, can be within the range from about 100° F. up to not essentially above about 250° F. Drying times can be on the order of from about 2 to about 25 minutes.

For the substrates containing applied coating composition, the subsequent curing of the composition on the substrate will usually be a hot air oven cure, although other curing procedures can be used, e.g., infrared baking and induction curing. The coating composition will be heat-cured at elevated temperature, e.g., on the order of about 450° F., but usually greater, oven air temperature. The cure will typically provide a substrate temperature, usually as a peak metal temperature, of at least about 450° F. Oven air temperatures may be more elevated, such as on the order of 650° F., but for economy, the substrate temperature need not exceed about 450° F. Curing, such as in a hot air convection oven, can be carried on for several minutes. Although cure times may be less than 5 minutes, they are more typically on the order of from about 10 to about 40 minutes. It is to be understood that cure times and temperatures can be effected where more than one coating is applied or where a subsequently applied, heat-cured topcoating will be used. Thus, shorter time and lower temperature cures can be employed when there will be applied one or more additional coatings or a topcoating that proceeds through an elevated temperature bake at a longer cure time. Also, where more than one coating is applied or a heat-curable topcoating will be applied, the first coating, or undercoating, may only need be dried, as discussed hereinabove. Then, curing can proceed after application of a second coating, or of a heat-cured topcoating.

The resulting weight of the coating on the metal substrate may vary to a considerable degree, but will always be present in an amount supplying greater than 500 mg/ft$^2$ of coating. A lesser amount will not lead to desirably enhanced corrosion-resistance. Advantageously, a coating of greater than about 1,000 mg/ft$^2$ of coated substrate will be present for best corrosion-resistance, while most typically between about 2,000 to 5,000 mg/ft$^2$ of coating will be present. In this coating, there will generally be present from about 400 mg/ft$^2$ to about 4,500 mg/ft$^2$ of particulate metal.

Before use, the coated substrate may be topcoated, e.g., with silica substance. The term "silica substance", as it is used herein for the topcoating, is intended to include both silicates and colloidal silicas. The colloidal silicas include both those that are solvent-based as well as aqueous systems, with the water-based colloidal silicas being most advantageous for economy. As is typical, such colloidal silicas can include additional ingredients, e.g., thickeners as, for example, up to about 5 weight percent of an above-discussed water-soluble cellulose ether. Also, a minor amount, e.g., 20 to 40 percent by weight and usually a lesser amount, of the colloidal silicas can be replaced by colloidal alumina. In general, the use of colloidal silicas will provide for heavier topcoats of silica substance over undercoated substrate materials. It is contemplated to use colloidal silicas containing up to 50 percent by weight solids, but typically, much more concentrated silicas will be diluted, for example, where spray application of the topcoat will be used.

When the topcoating silica substance is silicate, it may be organic or inorganic. The useful organic silicates include the alkyl silicates, e.g., ethyl, propyl, butyl and polyethyl silicates, as well as alkoxyl silicates such as ethylene glycol monoethyl silicate. Most generally for economy, the organic silicate is ethyl silicate. Advantageously, the inorganic silicates are used for best economy and corrosion-resistance performance. These are typically employed as aqueous solutions, but solvent-based dispersions may also be used. When used herein in reference to silicates, the term "solution" is meant to include true solutions and hydrosols. The preferred inorganic silicates are the aqueous silicates that are the water-soluble silicates, including sodium, potassium, lithium and sodium/lithium combinations, as well as other related combinations. Referring to sodium silicate as representative, the mole ratios of $SiO_2$ to $Na_2O$ generally range between 1:1 and 4:1. For best efficiency and economy, an aqueous-based sodium silicate is preferred as the silica substance. The use of silica substance as a topcoating has been described in U.S. Pat. No. 4,365,003, the disclosure of which is incorporated herein by reference.

Other ingredients may be present in the silica substance topcoating composition, e.g., wetting agents and colorants, but the composition should be chrome-free as defined hereinabove. Substances that may be present can further include thickening and dispersing agents as well as pH adjusting agents, but all such ingredients will typically not aggregate more than about 5 weight percent, and usually less, of the topcoating composition so as to provide for enhanced coating composition stability coupled with augmented coating integrity. The silica substance topcoating may be applied by any of the above described various techniques for use with the coating composition, such as immersion techniques including dip drain and dip spin procedures.

By any coating procedure, the topcoat should be present in an amount above about 50 mg/ft$^2$ of coated substrate. For economy, topcoat weights for cured topcoating will not exceed about 2,000 mg/ft$^2$ of coated substrate. This range is for the cured silica substance topcoating. Preferably, for best coating efficiency and silica substance topcoat economy, the topcoat is an inorganic silicate providing from about 200 to about 800 mg/ft$^2$ of cured silicate topcoating.

For the silica substance topcoat curing, it is typical to select the curing conditions in accordance with the particular silica substance used. For the colloidal silicas, air drying may be sufficient; but, for efficiency, elevated temperature curing is preferred for all the silica substances. The elevated temperature curing can be preceded by drying, such as air drying. Regardless of prior drying, a lower cure temperature, e.g., on the order of about 150° F. to about 300° F., will be useful for the colloidal silicas and organic silicates. For the inorganic silicates, curing typically takes place at a temperature on the order of about 300° F. to about 500° F. In general, cure temperatures on the order of from about 150° F. to about 800° F. or more, e.g., 1,000° F., are useful, such temperatures being peak metal temperatures. At the more elevated temperatures, cure times may be as fast as about 10 minutes, although longer cure times, up to about 20 minutes, are more usual. Also, articles can be topcoated with the silica substance topcoat while the articles are at elevated temperature, as from the curing of the water-reducible coating composition. Such could be done as by spray coat or dip drain, i.e., a dipping of the elevated temperature article into the topcoat composition, which can provide a quenching of the article. Upon removal from the topcoating composition, the article can be drained. Some to all of the topcoat curing can be achieved by the operation.

Before use, the coated substrate with the coating from the water-reducible coating composition may also be further topcoated with any other suitable topcoating, i.e., a paint or primer, including electrocoating primers and weldable primers, such as the zinc-rich primers that may be typically applied before electrical-resistance welding. For example, it has already been shown in U.S. Pat. No. 3,671,331 that a primer topcoating containing a particulate, electrically conductive pigment, such as zinc, is highly serviceable for a metal substrate that is first coated with another coating composition. Other topcoating paints may contain pigment in a binder or can be unpigmented, e.g., generally cellulose lacquers, resin varnishes, and oleoresinous varnishes, as for example tung oil varnish. The paints can be solvent-reduced or they may be water-reduced, e.g., latex or water-soluble resins, including modified or soluble alkyds, or the paints can have reactive solvents such as in the polyesters or polyurethanes. Additional suitable paints which can be used include oil paints, including phenolic resin paints, solvent-reduced alkyds, epoxies, acrylics, vinyl, including polyvinyl butyral, and oil-wax-type coatings such as linseed oil-paraffin wax paints.

Of special interest, the coated substrate with the coating from the water-reducible coating composition can form a particularly suitable substrate for paint deposition by electrocoating. The electrodeposition of film-forming materials is well known and can include electrocoating of simply a film-forming material in a bath or such a bath which may contain one or more pigments, metallic particles, drying oils, dyes, extenders, and the like, and the bath may be a dispersion or ostensible solution and the like. Some of the well known resinous materials useful as film-forming materials include the polyester resins, alkyd resins, acrylate resins, hydrocarbon resins, and epoxy resins, and such materials can be reacted with other organic monomers and/or polymers including hydrocarbons such as ethylene glycol, monohydric alcohols, ethers, and ketones.

Also of interest are polycarboxylic acid resins which can be solubilized with polyfunctional amino compounds and include the siccative oil-modified poly-basic acids, esters or anhydrides which can be further reacted with divinyl benzene for example or acrylic acid and esters as well as polymerizable vinyl monomers. Further, substances of interest are the anodically deposited film-forming materials. However, the broad scope to which the electrodeposition of film-forming materials relates, includes the deposition of such materials on anodic or cathodic substrates, and by means of various techniques for passage of current through a bath. After electrodeposition and removal of the coated substrate from the bath, curing of the film-forming materials can be performed. The time and temperature of curing will be dependent upon the film-forming materials present, but is typically an air cure at room temperature or a forced cure at a temperature up to 500° F. and for times up to 60 minutes, at more reduced temperatures.

An additional topcoat of special interest is a coating applied by quench coating. Thus the coated substrate with the coating from the water-reducible coating composition may proceed to a quench coating, e.g., following heat curing of the water-reducible coating, as has been mentioned hereinabove, for silica substance topcoatings. Such quench coating of articles at elevated temperature by bringing them into contact with an aqueous resin solution has been discussed in Japanese Patent Application No. 53-14746. Suitable resin solutions include alkyd, epoxy, melamine and urea resins.

For this, it has also been taught, for example in U.S. Pat. No. 4,555,445, that suitable topcoating compositions may be pigmented dispersions or emulsions. These can include copolymer dispersions in liquid medium as well as aqueous emulsions and dispersions of suitable waxes. Articles can be topcoated in these compositions, which articles are at elevated temperature such as after curing of the applied water-reducible coating, by procedures including a dip-drain or a spray coating operation. By such quench coating operation, all of the topcoating curing may be achieved without further heating. Quench coating with polymeric solutions, emulsions and dispersions, and with heated baths, has also been discussed in U.S. Pat. No. 5,283,280.

Another topcoat of particular interest are the autodeposited coatings. The autodeposition of coatings provides a latex-based coating film on metal articles, with no external voltage applied in the process. In the U.S. Pat. No. 3,592,699, it is taught to apply a coating from a bath of suitable polymer latex, oxidizing agent, fluoride ion and sufficient acid to maintain a pH of from about 2.5 to 3.5. Formulated as such an acidic composition, the bath can use metal dissolution as a driving force for coating deposition. More recently, U.S. Pat. No. 5,300,323 has taught a zinc surface pretreatment with an aqueous HF solution containing an additive such as boric acid. This can help negate the formation of pinholes during autodeposition coating.

Before coating, it is in most cases advisable to remove foreign matter from the substrate surface, as by thoroughly cleaning and degreasing. Degreasing may be accomplished with known agents, for instance, with agents containing sodium metasilicate, caustic soda, carbon tetrachloride, trichlorethylene, and the like. Commercial alkaline cleaning compositions which combine washing and mild abrasive treatments can be employed for cleaning, e.g., an aqueous trisodium phosphate-sodium hydroxide cleaning solution. In addition to cleaning, the substrate may undergo cleaning plus etching.

The following examples show ways in which the invention has been practiced but should not be construed as limiting the invention. In the examples, the following procedures have been employed:

PREPARATION OF TEST PANELS

Unless otherwise specifically described, test panels are typically 4×8-inch cold rolled, low carbon steel panels. Steel panels can be prepared for coating by first immersing in a cleaning solution. A metal cleaning solution can contain 5 ounces, per each gallon of water, of a mixture of 25 weight percent tripotassium phosphate and 75 weight percent potassium hydroxide. This alkaline bath is maintained at a temperature of about 150° F. to 180° F. Following solution cleaning, the panels can be scrubbed with a cleaning pad, which is a porous, fibrous pad of synthetic fiber impregnated with an abrasive. Thereafter, the scrubbed panels are water-rinsed and again immersed in cleaning solution. Following removal from the solution, the panels are rinsed with tap water and preferably dried.

APPLICATION OF COATING TO TEST PARTS AND COATING WEIGHT

Clean parts are typically coated by dipping into coating composition, removing and draining excess composition therefrom, sometimes with a mild shaking action, and then immediately baking or air drying at room temperature or precuring at modest temperature until the coating is dry to the touch and then baking. Baking and precuring proceeds in a hot air convection oven at temperatures and with times as specified in the examples.

Coating weights for panels, generally expressed as a weight per unit of surface area, is typically determined by selecting a panel of a known surface area and weighing it before coating. After the panel has been coated, it is reweighed and the coating weight per selected unit of surface area, most always presented as mg/ft$^2$, is arrived at by straightforward calculation.

MANDREL TEST BENDING (ASTM-D 522)

The conical mandrel test is carried out by the test procedure of ASTM D-522. Briefly, the testing method consists of deforming a coated metal panel by fastening the panel tangentially to the surface of a conical steel mandrel and forcing the sheet to conform to the shape of the mandrel by means of a roller bearing, rotatable about the long axis of the cone, and disposed at the angle of the conical surface, the angle of deformation or arc travel of the roller bearing being approximately 180°. Following the deformation, a strip of tape coated with a pressure-sensitive adhesive is pressed against the painted surface on the deformed portion of the test panel and is then quickly removed. The coating is evaluated quantitatively according to the amount of paint removed by the adhesive on the tape, in comparison with the condition of a standard test panel.

CROSS-HATCH TEST

This test is conducted by scribing, through the coating to a metal panel with a sharp knife, a first set of parallel lines ⅛ inch apart. A second, similar set of lines is then scribed on the panel at right angles to the first set. Following this, a strip of tape coated with a pressure-sensitive adhesive is pressed against the painted surface on the scribed portion of the test panel and is then quickly removed. The coating is evaluated qualitatively according to the amount of paint removed by the adhesive on the tape, in comparison with the condition of a standard test panel.

CORROSION-RESISTANCE TEST (ASTM B117) AND RATING

Corrosion-resistance of coated parts is measured by means of the standard salt spray (fog) test for paints and varnishes ASTM B-117. In this test, the parts are placed in a chamber kept at constant temperature where they are exposed to a fine spray (fog) of a 5 percent salt solution for specified periods of time, rinsed in water and dried. The extent of corrosion of the test parts can be expressed as percent of red rust. For a test panel portion containing a conical mandrel deformed portion (bend), the bend corrosion can also be expressed as percent of red rust. Initially following coating and bending, a pressure-sensitive tape is applied to the bend. The tape is then quickly removed from the bend. This is done to determine coating adhesion. The panel is then subjected to the corrosion-resistance test.

EXAMPLE 1

To 172 grams (gm) of dipropylene glycol, there is blended with moderate agitation a wetter blend containing 9.8 gmof a nonionic, ethoxylated nonylphenol wetter ("nenw") having a molecular weight of 396 and a specific gravity of 1.0298 at 20/20° C. and 15.2 gm of a nenw having a molecular weight of 616 and a specific gravity of 1.057 at 20/20° C. To this mixture there is then added 37 grams of aluminum flake paste containing about 25 weight percent of dipropylene glycol, contributed with the flake. The aluminum flake can have particle thickness of about 0.1 micron and a longest dimension of discrete particles of about 80 microns. To the mixture of dipropylene glycol and wetter there is also added 266 grams of zinc paste. The zinc paste also contributes to the mixture a very minor amount of residual mineral spirits and contains zinc in flake form having a particle thickness of about 0.1 to 0.5 micron and a longest dimension of discrete particles of about 80 microns. Following initial blending of these ingredients by moderate agitation, they are then ground for about 40 minutes using a Cowles dissolver operating at approximately 2,000 revolutions per minute (rpm).

The resulting ground precursor mixture is then placed in a vessel and, to 500 weight parts of this ground mixture, there is added, with stirring, 50 weight parts of gamma-glycidoxypropyltrimethoxysilane (sometimes referred to hereinafter as the "Example 1 silane"). After mixing for 10 minutes, there is then added 2 weight parts of hydroxypropyl methyl cellulose thickener, and mixing is continued for 5 minutes to prepare a resulting slurry.

Additional compositions were prepared in the same manner, each using 500 weight parts of the precursor mixture and 2 weight parts of the thickener, but the silane was increased, stepwise, so that a second coating formulation contained 100 weight parts, a third contained 150 weight parts, and a fourth contained 200 weight parts of the silane. All four resulting coating formulation slurries were then reduced with deionized water using 300 weight parts for the first slurry containing 50 weight parts of the silane, and 200 weight parts of water for each of the remaining three slurries.

Clean test panels as described hereinabove were then coated in the manner also as described hereinabove, the panels being removed from the coating composition at a rate of 3 inches per minute. Each panel is precured for 10 minutes at an oven air temperature of 200° F. and cured for 15 minutes at an oven air temperature of 608° F., all in the manner as described hereinabove. Coating weights for the panels, determined as described above, were 2,809 mg/ft$^2$ for the panel coated in the composition containing the 50 weight parts of silane and then, for the remaining three compositions in the sequence of silane amount starting with 100 grams and proceeding up to 200 grams, were, respectively, 2,611 mg/ft$^2$, 2,073 mg/ft$^2$ and 2,279 mg/ft$^2$. All resulting panels had a smooth, grey coating of attractive appearance. Representative panels from each of the four coating formulations were then subjected to the above described conical mandrel bend test. The results of this test showed that the coating adhesion remained essentially the same for all coated panels.

A coated panel from each test formulation, which panels had been subjected to the conical mandrel test, were then subjected to the above described corrosion-resistance test. After one week of testing, all panels were pulled from the test. All panels exhibited red rust on the conical mandrel bend. However, on the general coated faces of the panels that did not receive the bend, there was no visible red rust.

A coated panel from each of the four test formulations was then topcoated before bending with a commercially available sodium silicate topcoat composition disclosed in the U.S. Pat. No. 4,365,003. Undercoated panels were coated with this topcoat formulation in the manner as described above, each panel being removed from the coating composition at a rate of 3 inches per minute. The topcoating was then cured in the manner as described above by baking the panels for 20 minutes at an oven air temperature of 350° F. Coating weight determinations, conducted in the manner as described above in connection with the examples, showed a topcoating weight for each panel of 123 mg/ft$^2$.

These resulting undercoated plus topcoated panels were then subjected to the above described conical mandrel bend test. The results of these tests showed that the topcoating improved overall coating adhesion. Following bending, the panels were then subjected to the above described corrosion-resistance test. After one week of testing, one panel showed 40 percent red rust, but only at the bend, with no red rust on the panel face, and the three other panels had no red rust on the panel face or the bend.

For shelf stability testing, the bath with the 100 weight parts of silane binding agent, which bath had been reduced with 200 weight parts of deionized water, was stored for about 12 weeks at room temperature in a covered container. After 12 weeks, bath stability was checked by visual inspection and by stirring, as well as by coating a panel. Bath stability was found to be acceptable on both visual inspection and stirring. Furthermore, coated panels subjected to the cross-hatch test described hereinabove, displayed coating adhesion comparable to coatings from freshly-prepared baths.

EXAMPLE 2

The precursor mixture as described in Example 1 was blended with the gamma-glycidoxypropyltrimethoxysilane in the manner of Example 1 to provide a mixture of 58.4 weight parts precursor and 5.9 weight parts silane. To this there was added 35.1 weight parts of deionized water, with mixing until uniform. To 850 weight parts of this bath there was then added, with moderate, overnight agitation, 1.2 percent by weight of orthoboric acid and 0.28 percent by weight of lithium carbonate. There was then blended with the resulting bath 0.2 percent by weight of hydroxypropylmethyl cellulose thickener to prepare the coating composition.

In this test, bolts, as more specifically described hereinbelow, are used. The bolts are prepared for coating as described hereinabove, except no scrubbing is used during cleaning and the bolts are cleaned by blasting with glass beads (dry honed) after oven drying. The bolts are coated by placing in a wire basket and dipping the basket into the coating composition, removing the basket and draining excess composition therefrom. During dip spinning, the basket is spun at 300 rpm for 10 seconds forward and 10 seconds reverse.

Draining is then followed by baking. The bolts are usually placed on a sheet for baking. Baking proceeds first at an air temperature of about 250° F. for a time up to 10 minutes and then at 450° F. for 30 minutes. The bolts are coated twice with the coating composition using this procedure and providing a coating weight of 3,116 mg/ft$^2$, determined as described hereinabove.

Selected bolts are then topcoated with the sodium silicate topcoat described in Example 1. The procedure used for coating and baking was as for the undercoating, but the basket spin was at 350 rpm for 5 seconds forward, 5 seconds reverse, and the cure was at 350° F. for 20 minutes.

The hex-head bolts used in the test are a specific grade of 9.8 bolts which more particularly are 1½ inches long by about 5/16 inch in diameter at the threaded end and have 1 3/16 inches of threading on the shaft that terminates in the bolt head.

The resulting coated bolts were then subjected to the hereinbefore described corrosion-resistance test. Bolts with only the undercoating, proceeded 336 hours in this test with only trace amounts of red rust. The test bolts with the silicate topcoat went 672 hours in testing until the appearance of first red rust.

EXAMPLE 3

A coating bath was prepared by first preparing a preblended premix by mixing together for one hour the following ingredients in parts by weight: 9.3 parts deionized water, 2.9 parts dipropylene glycol, 0.6 part orthoboric acid, 5.9 parts of the Example 1 silane, a blend of 1.2 parts of the wetter described in Example 1 having the 396 average molecular weight, blended with 1.8 parts of the wetter of Example 1 having the average molecular weight of 616. To this bath there was added, with grinding, 4.3 weight parts of the Example 1 aluminum flake paste and 31.2 weight parts of zinc paste. Deionized water was added after grinding, providing 41 weight parts additional water, and the cellulose thickener of Example 1 was added after grinding, supplying 0.4 weight part of thickener.

The bolts as described in Example 2 were prepared for coating as described in Example 2, but at a basket spin of 350 rpm for a first coat and 325 rpm for a second coat. Each coat was cured as described in Example 2, but at 600° F. oven temperature for 30 minutes. Total undercoating weights for the bolts were 2,331 mg/ft$^2$. Selected bolts were then topcoated with the silicate topcoating of Example 1 using the topcoat procedure of Example 2. Bolts were then tested in the above described corrosion-resistance test and the undercoated bolts proceeded to 72 hours before first red rust, while the topcoated bolts proceeded to 312 hours before first red rust.

EXAMPLE 4

To 93 grams (gm) of deionized water, there is blended with moderate agitation 29 gm of dipropylene glycol, 6 gm of ortho boric acid, 12 gm of the nonionic, ethoxylated nonylphenol wetter of Example 1 and 18 gm of the glycol ether wetter of Example 3. To this mixture is added 59 gm of the Example 1 silane. After mixing for one to two hours, 346 gm of the zinc paste of Example 1 is incorporated into the mixture using a Cowles dissolver, grinding at 1,500 to 1,800 rpm for 30 minutes. There is then added another 50 gm of deionized water and grinding continues for about 40 minutes. Deionized water is again added after grinding, providing 418 gm of additional water and with this additional water there is added 1.2 gm of lithium carbonate. After mixing with mild agitation for about 20 hours, 6 gm of ortho boric acid and 0.7 gm of lithium carbonate are added and mixing continues for four hours. The bath is then thickened with 2.5 gm of the cellulose thickener of Example 1, and pre-slurried with 8.7 gm of deionized water.

The bath was then used for coating bolts as described in Example 2. Bolts prepared as described hereinabove in Example 2 were coated in the manner described in Example 2, but with the basket spinning at 325 rpm. The bolts were precured by baking for 10 minutes at 250° F. The bolts were then cured by baking at 450° F. for 30 minutes. In this manner, two coatings were applied to each bolt. The bolts had a desirable coating appearance and a selected bolt was found to have a coating weight of 3,148 mg/ft$^2$, determined in the manner described hereinabove. Selected bolts were then topcoated with the silicate topcoating of Example 1. Bolts, both undercoated and topcoated, were then subjected to the above described corrosion resistance test. The bolts were found to provide an acceptable result from such test.

EXAMPLE 5

A bath was prepared to contain 0.6 weight percent ortho boric acid, 58.8 weight percent of the precursor mixture as described in Example 1, 5.9 weight percent of the Example 1 silane, 0.29 weight percent of hydroxypropyl methyl cellulose thickener and a balance of deionized water. The bath was prepared in the manner of Example 2. After preparation, the bath was stored at normal room temperature for approximately 2½ months in a covered container, and was maintained in mixed condition by frequent stirring.

After 2½ months of storage, the bath was then used for coating bolts as described in Example 2. Bolts prepared as described hereinabove in Example 2 were then coated in the manner as described in Example 2, but with basket spinning at 300 rpm. The bolts were baked without precuring at an oven air temperature of 600° F. for a time of 30 minutes. In this manner, two coatings were applied to each bolt. The bolts had a desirable coating appearance and a selected bolt was found to have a coating weight of 3,328 mg/ft$^2$, determined in the manner as described before. Selected bolts were then topcoated with the silicate topcoating of Example 1 using the coating and curing conditions and procedures as described for topcoating in Example 1. Bolts, both undercoated and topcoated, were then subjected to the above described corrosion-resistance test. The bolts were found to provide an acceptable result from such test. This bath was thus judged to have a highly desirable bath stability in this extended shelf life test.

EXAMPLE 6

To 150 weight parts water blended with 29 weight parts of dipropylene glycol, there is blended with moderate agitation 12 weight parts of the nonionic, ethoxylated nonylphenol wetter of Example 1 and 18 weight parts of the glycol ether wetter of Example 3. To this mixture there is then added 59 weight parts of the Example 1 silane and 6 weight parts of ortho boric acid as blending continues. After mixing continues for one hour, there is added to this mixture 330 weight parts of the zinc paste of Example 1. Following initial blending of these ingredients by moderate agitation, they are then ground for about 40 minutes using a Cowles dissolver operating at approximately 1,000 rpm. To this dispersion there is then slowly added and blended an additional 376 weight parts of deionized water. After mixing with mild agitation for 48 hours, the bath is thickened with 20 weight parts of Rheolate® 310 (Rheox Inc.), a non-ionic, urethane-free associative thickener that is a milky-white liquid having 38.5 percent solids, a specific gravity of 1.06 and a boiling point of 103° C.

The bath was then used for coating bolts as described in Example 2. Bolts prepared as described hereinabove in Example 2 were then coated in the manner as described in Example 2 but with basket spinning at 375 to 400 rpm. The bolts were baked with a precure of 140° F. for 10 minutes and cured for 30 minutes at 600° F. In this manner, three coatings were applied to each bolt. The bolts had a desirable coating appearance and a selected bolt was found to have a coating weight of about 2,859 mg/ft$^2$, determined in the manner as described before.

Selected bolts were then topcoated with a black-pigmented, commercially applied, anodic electrocoat primer. The bolts had a primer dry film thickness of 0.68 mil. For comparative purposes, bolts as described in Example 2 were first coated with a chromium-containing coating composition made by the assignee of the present invention (DACROMET 320®), which coating composition also contained particulate metal. The basecoat coating weight from such composition for the bolts was 2,800 mg/ft$^2$.

These comparative bolts were then also topcoated with the anodic electrocoat primer. The bolts had a primer dry film thickness of 0.55 mil. Both sets of bolts were then subjected to the above-described corrosion-resistance test. After 500 hours exposure, the comparative bolts, although displaying no red rust, showed appreciable white corrosion. Comparatively, the bolts with the invention basecoat were virtually free of white rust, as well as showing no red rust.

Additional selected, invention basecoated bolts were then topcoated with a black-pigmented, resin-containing aqueous quench coating composition having a pH of 1.95 and a specific gravity of 1.08 (Speedcote™ 3115 of Nippon Dacro Shamrock Co., Ltd.). The quench coat bath was maintained at 50° to 60° C. and basecoated bolts were immersed in the bath for about 3 to 5 seconds, removed and dried by forced hot air. The dry film topcoat film thickness was about 0.7 mil. The bolts, when tested in the above-described corrosion-resistance test, demonstrated desirable corrosion-resistance, providing protection with no red rust after over 400 hours of exposure.

We claim:

1. A chrome-free, and stable, water-reducible coating composition of aqueous medium for application to, and heat curing on, a substrate for providing corrosion protection thereto, said composition comprising:
   (A) water to provide said aqueous medium;
   (B) high-boiling organic liquid;
   (C) particulate metal;
   (D) thickener; and
   (E) water-reducible, epoxy functional silane binding agent contributing from about 3 to about 20 weight percent of the total composition weight.

2. The coating composition of claim 1 wherein said high-boiling organic liquid is present in an amount from about 1 to about 30 weight percent, basis total composition weight, and said high-boiling organic liquid has a molecular weight of 400 or less and boils above about 100° C.

3. The coating composition of claim 1 wherein said high-boiling organic liquid is an oxohydroxy liquid selected from the group consisting of tri- and tetraethylene glycol, di- and tripropylene glycol, the monomethyl, dimethyl, and ethyl ethers of these glycols, liquid polypropylene glycols, diacetone alcohol, the low molecular weight ethers of diethylene glycol and mixtures of the foregoing.

4. The coating composition of claim 1 wherein said particulate metal is a metal powder, a metal flake, or a mixture of metal powder and metal flake, said metal powder has particle size such that all powders are more finely divided than 100 mesh, and said particulate metal is one or more of zinc, aluminum, alloys and intermetallic mixtures of zinc or aluminum, and mixtures of the foregoing.

5. The coating composition of claim 1 containing from about 10 weight percent to about 35 weight percent of particulate zinc, basis total composition weight, and containing particulate aluminum in an amount from about 1.5 to about 35 weight percent of particulate aluminum, basis total composition weight.

6. The coating composition of claim 4 containing both zinc and aluminum in a weight ratio of zinc to aluminum up to about 1:1.

7. The coating composition of claim 1 containing from about 0.05 to about 2.0 weight percent of thickener, basis total composition weight, and said thickener is selected from the group consisting of cellulosic thickener, xanthan gum, modified clays and associative thickeners.

8. The coating composition of claim 7 containing from about 0.2 to about 1.2 weight percent of thickener, and said thickener is cellulosic thickener selected from the group consisting of hydroxyethylcellulose, methylcellulose, methylhydroxypropylcellulose, ethylhydroxyethylcellulose, methylethylcellulose, and mixtures thereof.

9. The coating composition of claim 1 wherein said silane is one or a mixture of beta-(3,4-epoxycyclohexyl) ethyltrimethoxy-silane, 4(trimethoxysilyl)butane-1,2 epoxide and gamma-glycidoxypropyltrimethoxysilane and said silane is present in an amount from about 5 to about 12 weight percent, basis total composition weight.

10. The coating composition of claim 1 wherein all of said ingredients (A), (B), (C), (D) and (E) are present in one package, and said package further contains wetting agent.

11. The coating composition of claim 10 wherein said composition contains from about 0.01 to about 3 weight percent of wetting agent, basis total composition weight, and said wetting agent is a nonionic wetting agent.

12. The coating composition of claim 1 further containing from about 0.1 to about 10 weight percent of boron-containing compound, basis total composition weight, with said boron-containing compound being selected from the group consisting of orthoboric acid, metaboric acid, tetraboric acid and boron oxide, as well as mixtures thereof.

13. The coating composition of claim 1 wherein said composition additionally contains from about 0.1 to about 2.0 weight percent of corrosion-inhibitor, basis total composition weight, with said corrosion-inhibitor being selected from the group consisting of calcium nitrate, dibasic ammonium phosphate, calcium sulfonate, lithium carbonate, and their mixtures.

14. The coating composition of claim 1 wherein said water-reducible composition contains water in an amount from about 30 to 60 weight percent, basis total composition weight.

15. A pre-blended package of ingredients for a chrome-free, water-reducible coating composition for application to, and heat curing on, a substrate for providing corrosion protection thereto, said pre-blended package composition comprising high-boiling organic liquid boiling above about 100° C., wetting agent and water-reducible, epoxy functional silane binding agent in sufficient amount to contribute from about 3 to about 20 weight percent of the total weight for said water-reducible coating composition.

16. The package composition of claim 15 wherein said composition is resin-free, additionally contains boron-containing compound, contains said boron-containing compound in an amount from about 2 to about 10 weight percent and silane binding agent in an amount from about 15 to about 60 weight percent, both basis total package composition weight.

17. The package composition of claim 15 wherein said boron-containing compound is selected from the group consisting of orthoboric acid, metaboric acid, tetraboric acid, boron oxide, as well as mixtures thereof.

18. The package composition of claim 15 wherein said silane is one or a mixture of beta-(3,4-epoxycyclohexyl) ethyltrimethoxysilane 4(trimethoxysilyl) butane-1,2 epoxide and gamma-glycidoxypropyltrimethoxysilane and said silane is present in an amount to provide from about 5 to about 12 weight percent of said silane, basis total water-reducible coating composition weight.

19. The package composition of claim 15 wherein said composition contains from about 20 to about 30 weight percent of nonionic wetting agent, basis total package weight, and said package is blended with aqueous medium to prepare said coating composition.

20. The package composition of claim 15 wherein said composition additionally contains from about 0.5 to about 5 weight percent of corrosion-inhibitor, basis total package weight, and said corrosion-inhibitor is selected from the group consisting of calcium nitrate, dibasic ammonium phosphate, calcium sulfonate, lithium carbonate, and their mixtures.

21. The package composition of claim 15 wherein said composition additionally contains from about 2 to about 15 weight percent of thickener, basis total package weight, and said thickener is selected from the group consisting of cellulosic thickener, xanthan gum, modified clays and associative thickeners.

22. The package composition of claim 15 wherein said high-boiling organic liquid has a molecular weight of 400 or less and said composition is blended with aqueous medium and a particulate metal of metal powder, metal flake, or a mixture of metal powder and metal flake to prepare a coating composition.

23. The coating composition made by the blending of said particulate metal of claim 22 with said pre-blended package of claim 15 and aqueous medium.

24. The package composition of claim 23 wherein said particulate metal is one or more of zinc, aluminum, alloys and intermetallic mixtures of zinc or aluminum, and mixtures of the foregoing.

25. A pre-blended package of ingredients for a chrome-free, water-reducible coating composition for application to, and heat curing on, a substrate for providing corrosion protection thereto, said pre-blended package composition comprising aqueous medium, boric acid component and water-reducible epoxy functional silane binding agent in sufficient amount to contribute from about 3 to about 20 weight percent of the total weight for said water-reducible coating composition.

26. The package composition of claim 25 wherein said composition is resin-free, contains said boron-containing compound in an amount from about 2 to about 10 weight percent and contains said silane binding agent in an amount from about 15 to about 80 weight percent, both basis total package composition weight.

27. The package composition of claim 25 wherein said boron-containing compound is selected from the group consisting of orthoboric acid, metaboric acid, tetraboric acid, boron oxide, as well as mixtures thereof.

28. The package composition of claim 27 wherein said silane is one or a mixture of beta-(3,4-epoxycyclohexyl) ethyltrimethoxysilane 4(trimethoxysilyl) butane-1,2 epoxide and gamma-glycidoxypropyltrimethoxy-silane and said silane is present in an amount to provide from about 5 to about 12 weight percent of said silane, basis total water-reducible coating composition weight.

29. The package composition of claim 25 wherein said composition contains from about 10 to about 30 weight percent of nonionic wetting agent, basis total package weight, additionally contains from about 0.5 to about 5 weight percent of corrosion-inhibitor, basis total package weight, and said corrosion-inhibitor is selected from the group consisting of calcium nitrate, dibasic ammonium phosphate, calcium sulfonate, lithium carbonate, and their mixtures.

30. The package composition of claim 25 wherein said composition additionally contains from about 2 to about 15 weight percent of thickener, basis total package weight, and said thickener is selected from the group consisting of cellulosic thickener, xanthan gum, modified clays and associative thickeners.

31. The package composition of claim 25 wherein said composition is blended with a particulate metal of metal powder, metal flake, or a mixture of metal powder and metal flake to prepare a coating composition.

32. The coating composition made by the blending of said particulate metal of claim 31 with said pre-blended package of claim 25.

33. The package composition of claim 32 wherein said particulate metal is one or more of zinc, aluminum, alloys and intermetallic mixtures of zinc or aluminum, and mixtures of the foregoing.

34. A pre-blended package of ingredients for a chrome-free, water-reducible coating composition for application to, and heat curing on, a substrate for providing corrosion protection thereto, said pre-blended package composition consisting essentially of high-boiling organic liquid boiling above about 100° C., water-reducible epoxy functional silane binding agent in sufficient amount to contribute from about 3 to about 20 weight percent of the total weight for said water-reducible coating composition, and particulate metal.

35. The package composition of claim 34 wherein said silane is one or a mixture of beta-(3,4-epoxycyclohexyl) ethyltrimethoxysilane 4(trimethoxysilyl) butane-1,2 epoxide and gamma-glycidoxypropyltrimethoxysilane and said silane is present in an amount from about 20 to about 35 weight percent, basis total weight of said package composition.

36. The package composition of claim 34 wherein said high-boiling organic liquid has a molecular weight of 400 or less, said high-boiling organic liquid is present in an amount from about 20 to about 35 weight percent, basis total weight of said package, and said particulate metal is one or more of metal powder, metal flake, or a mixture of metal powder and metal flake.

37. The package composition of claim 34 wherein said particulate metal is one or more of zinc flake, aluminum flake, or alloys and intermetallic mixtures of said zinc flake or aluminum flake.

38. A coated substrate protected with a chrome-free, corrosion-resistant coating containing particulate metal, which coating is established on said substrate by heat curing an applied coating composition containing high-boiling organic liquid, particulate metal, thickener and water-reducible, epoxy functional silane binding agent providing from about 3 to about 20 weight percent of total composition weight, all in aqueous medium.

39. The coated substrate of claim 38 wherein said coating is established from a one-package composition and in an amount providing from about 500 up to about 5,000 mg/ft$^2$ of cured coating on said substrate, with said coating containing said particulate metal in an amount from about 400 up to about 4,500 mg/ft$^2$ of cured coating.

40. The coated substrate of claim 38 wherein applied coating is heat cured on said substrate by heating at a temperature within the range from about 400° F. to about 650° F. for a time of at least about 5 minutes.

41. The coated substrate of claim 38 wherein curing of said coating on said substrate includes drying for a time from about 2 to about 25 minutes at a temperature up to about 250° F.

42. The coated substrate of claim 38 wherein said substrate is a metal substrate, including a steel or zinc substrate.

43. The coated substrate of claim 38 wherein said substrate is a pretreated metal substrate having a pretreatment coating of one or more of iron phosphate or zinc phosphate.

44. The coated substrate of claim 43 wherein said iron phosphate coating is present in an amount from about 50 to about 100 mg/ft$^2$ and said zinc phosphate coating is present in an amount from about 200 to about 2,000 mg/ft$^2$.

45. The coated substrate of claim 38 wherein said coating is established by curing applied coating composition containing high-boiling organic liquid having a molecular weight of 400 or less and boiling above about 100° C.

46. The coated substrate of claim 38 wherein said coated substrate is further topcoated with a substantially resin-free topcoating composition curable to a water-resistant protective coating and containing silica substance in liquid medium applied in an amount sufficient to provide above about 50 mg/ft$^2$ of coated substrate of silica substance in cured coating.

47. The coated substrate of claim 46 wherein said topcoating is cured by heating at a temperature within the range from about 150° F. to about 1,000° F. for a time of at least about 10 minutes, said topcoating provides not substantially above about 2,000 mg/ft$^2$ of said silica substance in cured coating, and said topcoating provides silica substance from one or more of colloidal silica, organic silicate and inorganic silicate.

48. The coated substrate of claim 38 wherein said coated substrate is further topcoated with a topcoating composition of one or more of electrocoat primer, autodeposition coating or quench coating topcoat.

49. The method of preparing a corrosion-resistant coated substrate protected with a chrome-free, particulate-metal-containing and water-reducible coating composition, which method comprises applying as said coating composition a particulate-metal-containing composition containing, in addition to said particulate metal, high-boiling organic liquid, thickener, and water-reducible, epoxy functional silane binding agent, providing from about 3 to about 20 weight percent of total coating composition weight, all in aqueous medium, with said coating composition being applied in an amount sufficient to provide, upon curing, above about 500 but not substantially above about 5,000 mg/ft$^2$ of coating on said coated substrate, and heat curing applied coating composition on said substrate at a temperature up to about 650° F. for a time of at least about 5 minutes.

50. The method of claim 49 wherein there is applied said water-reducible coating composition as a one-package composition in aqueous medium containing water in an amount from about 30 to about 60 weight percent, plus containing up to about 1 weight percent of wetting agent, both basis total composition weight.

51. The method of claim 49 wherein said coating is cured at a temperature within the range from about 400° F. to about 650° F. for a time not exceeding about 40 minutes.

52. The method of claim 49 wherein said coating is preceded in curing by drying for a time from about 2 to about 25 minutes at a temperature up to about 250° F.

53. The method of claim 49 wherein there is applied said coating composition containing high-boiling organic liquid having a molecular weight of 400 or less and boiling above about 100° C.

54. A coated metal substrate, prepared by the method of claim 49.

55. The method of claim 49 wherein said coating composition is applied to a pretreated metal substrate having a pretreatment coating of one or more of iron phosphate or zinc phosphate.

56. The method of claim 55 wherein said iron phosphate coating is present in an amount from about 50 to about 100 mg/ft$^2$ and said zinc phosphate coating is present in an amount from about 200 to about 2,000 mg/ft$^2$.

57. The coated metal substrate prepared by the method of claim 55.

58. The method of claim 49 wherein there is applied a topcoating on said coating, which topcoating is a substantially resin-free composition that is cured on said coating to a water-resistant protective coating, and said composition contains silica substance in liquid medium, said topcoating being in an amount sufficient to provide above about 50 mg/ft$^2$ of coated substrate of silica substance in cured coating.

59. The method of claim 58 wherein said topcoating is cured by heating at a temperature within the range from about 150° F. to about 1,000° F. for a time of at least about 10 minutes and there is applied sufficient topcoating to provide not substantially above about 2,000 mg/ft$^2$ of said silica substance in cured topcoating.

60. A coated metal substrate prepared by the method of claim 58.

61. The method of claim 49 wherein there is applied a topcoating on said coating, which topcoating provides a protective coating of one or more of electrocoat primer, autodeposition coating or quench coating topcoat.

62. A coated metal substrate prepared by the method of claim 61.

63. The method of preparing a chrome-free water-reducible coating composition for application to, and heat curing on, a substrate for providing corrosion-resistance thereto, which method comprises blending together a precursor mixture of high-boiling organic liquid, wetting agent and particulate metal, then admixing with the resulting precursor mixture water-reducible, epoxy functional silane binding agent.

64. The method of claim 63 wherein there is blended together a precursor mixture of organic liquid having a molecular weight of 400 or less and boiling above about 100° C., with particulate metal of one or more of powdered metal or flaked metal, and nonionic wetting agent.

65. The method of claim 64 wherein there is blended together from about 25 to about 40 weight parts of said organic liquid, from about 4 to about 8 weight parts of said wetting agent, with a balance of said particulate metal basis 100 weight parts of said precursor mixture, and said precursor mixture is blended together by grinding.

66. The method of claim 63 wherein there is added to said coating composition aqueous medium in an amount providing from about 50 weight percent to about 90 weight percent of aqueous medium in the resulting aqueous composition.

67. The method of claim 63 wherein said wetting agent is blended with said organic liquid, then said particulate metal is admixed thereto to form said precursor mixture and there is admixed thereto sufficient silane binding agent to provide from about 3 to about 20 weight percent of said binding agent, basis total coating composition weight.

68. The coating composition made by the method of claim 67 prepared as a one-package coating composition.

69. The method of claim 63 wherein there is admixed, with said precursor mixture, thickening agent in an amount sufficient to provide from about 0.05 to about 2.0 weight percent of said thickening agent, basis total coating composition weight.

70. The coating composition made by the method of claim 69.

71. The method of preparing a chrome-free, water-reducible coating composition for application to, and heat curing on, a substrate for providing corrosion-resistance thereto, which method comprises first preparing a premixture by blending together a mixture comprising high-boiling organic liquid, wetting agent and water-reducible epoxy functional silane binding agent, then admixing particulate metal with the resulting premixture.

72. The method of claim 71 wherein there is blended together from about 20 to about 30 weight parts of said wetting agent, from about 40 to about 60 weight parts of said silane binding agent, from about 20 to about 30 weight parts of organic liquid having a molecular weight of 400 or less and boiling above about 100° C., and 100 weight parts of this composition is next mixed with from about 30 to about 60 weight parts of aqueous medium.

73. The method of claim 71 wherein there is blended together a pre-blended premix further containing boron-containing compound in an amount from about 3 to about 6 weight parts of said boron-containing compound, basis weight of said premix.

74. The method of claim 71 wherein said composition is aged for a time of from about 1 hour to about 7 days before admixing with said particulate metal.

75. The method of claim 71 wherein there is blended together sufficient silane binding agent to provide about 3 to about 20 weight percent of said binding agent, basis total weight of said water-reducible coating composition.

76. The coating composition made by the method of claim 75 prepared as a one-package coating composition.

77. The method of claim 71 wherein there is admixed, with said premixture, thickening agent, in an amount sufficient to provide from about 0.05 to about 2.0 weight percent of said thickening agent, basis total coating composition weight.

78. The coating composition made by the method of claim 77.

* * * * *

UNITED STATES PATENT AND TRADEMARK OFFICE
CERTIFICATE OF CORRECTION

PATENT NO.    : 5,868,819
DATED         : February 9, 1999
INVENTOR(S)   : Guhde et al.

It is certified that error appears in the above-identified patent and that said Letters Patent is hereby corrected as shown below:

Column 19,
Lines 49-51, cancel the text "zinc to aluminum" and replace with -- aluminum to zinc --.

Signed and Sealed this

Sixth Day of September, 2005

JON W. DUDAS
*Director of the United States Patent and Trademark Office*